(12) United States Patent
Klaedtke

(10) Patent No.: US 10,725,887 B2
(45) Date of Patent: Jul. 28, 2020

(54) METHOD FOR OPERATING A MONITORING ENTITY

(71) Applicant: NEC Laboratories Europe GmbH, Heidelberg (DE)

(72) Inventor: Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/479,285

(22) PCT Filed: Dec. 6, 2017

(86) PCT No.: PCT/EP2017/081693
§ 371 (c)(1),
(2) Date: Jul. 19, 2019

(87) PCT Pub. No.: WO2018/133986
PCT Pub. Date: Jul. 26, 2018

(65) Prior Publication Data
US 2019/0384689 A1    Dec. 19, 2019

(30) Foreign Application Priority Data
Jan. 23, 2017 (EP) ..................................... 17152709

(51) Int. Cl.
*G06F 11/34* (2006.01)
*G06F 11/30* (2006.01)

(52) U.S. Cl.
CPC ...... *G06F 11/3495* (2013.01); *G06F 11/3006* (2013.01)

(58) Field of Classification Search
CPC ............. G06F 11/3495; G06F 11/3006; G06F 11/3438; G06F 11/3419; G06F 11/3409; G06F 11/0751
See application file for complete search history.

(56) References Cited

U.S. PATENT DOCUMENTS

| | | | |
|---|---|---|---|
| 7,082,044 B2 * | 7/2006 | Gould | G06F 7/02 365/49.1 |
| 7,301,792 B2 * | 11/2007 | Gould | G06F 7/02 365/49.15 |

(Continued)

OTHER PUBLICATIONS

Basin, David, Felix Klaedtke, and Eugen Zălinescu. "Runtime verification of temporal properties over out-of-order data streams." International Conference on Computer Aided Verification. Springer, Cham, 2017.*

(Continued)

*Primary Examiner* — Jimmy H Tran
(74) *Attorney, Agent, or Firm* — Leydig, Voit & Mayer, Ltd.

(57) ABSTRACT

A method for operating a monitoring entity (ME) for a distributed system includes receiving, by the ME, an action message from a computing device which has information about an action it performed. The ME, generates, deletes and/or updates a node of a data structure stored in a memory of the ME to provide an updated state of the data structure, by: processing the information of the received message, and storing the processed information into the data structure. The data structure represents knowledge about behavior of the distributed system. Each node specifies a policy by a formula, a node is linked by a trigger to one other node only to specify dependencies between nodes except for nodes with a formula, monitored by the ME, and nodes with a same formula are mutually linked by triggers. Verdict information indicating an action violating a policy is computed based on the updated state.

15 Claims, 8 Drawing Sheets

(56) References Cited

U.S. PATENT DOCUMENTS

| | | | | |
|---|---|---|---|---|
| 7,895,317 | B2* | 2/2011 | Gingell, Jr. | G06F 9/5055 709/223 |
| 8,095,494 | B2* | 1/2012 | Andrade | G06N 5/025 706/47 |
| 8,156,222 | B2* | 4/2012 | Gingell, Jr. | G06F 9/5055 709/223 |
| 8,719,804 | B2* | 5/2014 | Jain | G06F 11/3006 717/117 |
| 8,949,409 | B2* | 2/2015 | Schuster | G06F 11/3006 709/223 |
| 9,122,993 | B2* | 9/2015 | Chester | G06N 5/043 |
| 9,411,702 | B2* | 8/2016 | Eilam | G06F 11/3006 |
| 9,438,641 | B2* | 9/2016 | Garg | H04M 3/436 |
| 9,659,251 | B2* | 5/2017 | Tang | H04L 41/00 |
| 10,374,870 | B2* | 8/2019 | Klaedtke | H04L 47/2483 |
| 10,397,349 | B2* | 8/2019 | Gagliardi | G06F 11/3072 |
| 10,432,511 | B2* | 10/2019 | Bifulco | H04L 63/1491 |
| 10,445,169 | B2* | 10/2019 | Baca | G06F 11/0724 |
| 10,452,467 | B2* | 10/2019 | Estrada | G06F 11/3495 |
| 10,530,840 | B2* | 1/2020 | Helsley | G06F 11/3409 |
| 2010/0325265 | A1* | 12/2010 | Schuster | G06F 11/3006 709/224 |
| 2011/0078291 | A1* | 3/2011 | Bickson | G06F 11/3409 709/221 |
| 2011/0276951 | A1* | 11/2011 | Jain | G06F 11/3006 717/140 |
| 2015/0067404 | A1* | 3/2015 | Eilam | G06F 11/3006 714/38.1 |
| 2016/0337164 | A1* | 11/2016 | Klaedtke | H04L 41/06 |
| 2017/0142026 | A1* | 5/2017 | Klaedtke | H04L 41/0803 |
| 2017/0220407 | A1* | 8/2017 | Estrada | G06F 11/3495 |
| 2018/0048561 | A1* | 2/2018 | Bifulco | H04L 41/0893 |
| 2018/0285250 | A1* | 10/2018 | Helsley | H04L 67/10 |

OTHER PUBLICATIONS

Basin, David, Felix Klaedtke, and Eugen Zălinescu. "Failure-aware runtime verification of distributed systems." 35th IARCS Annual Conference on Foundations of Software Technology and Theoretical Computer Science (FSTTCS 2015). vol. 45. Leibniz-Zentrum für Informatik, 2015.*

Basin, David, et al. "Monitoring metric first-order temporal properties." Journal of the ACM (JACM) 62.2 (2015): 1-45.*

Basin, David, Felix Klaedtke, and Samuel Müller. "Policy monitoring in first-order temporal logic." International Conference on Computer Aided Verification. Springer, Berlin, Heidelberg, 2010.*

Basin, David, et al. "Runtime monitoring of metric first-order temporal properties." IARCS Annual Conference on Foundations of Software Technology and Theoretical Computer Science. Schloss Dagstuhl-Leibniz-Zentrum für Informatik, 2008.*

Basin, David, et al. "MONPOLY: Monitoring usage-control policies." International conference on runtime verification. Springer, Berlin, Heidelberg, 2011.*

Basin, David, Felix Klaedtke, and Eugen Zălinescu. "Algorithms for monitoring real-time properties." International Conference on Runtime Verification. Springer, Berlin, Heidelberg, 2011.*

Basin, David, et al. "Monitoring of temporal first-order properties with aggregations." Formal methods in system design 46.3 (2015): 262-285.*

Basin, et al., "Monitoring Metric First-Order Temporal Properties," 1-38 (Jan. 1, 2010), XP055142354.

Basin, et al., "Policity Monitoring in First-Order Temporal Logic," *Computer Aided Verification*: 1-18 (Jul. 15, 2010), XP019146657.

* cited by examiner

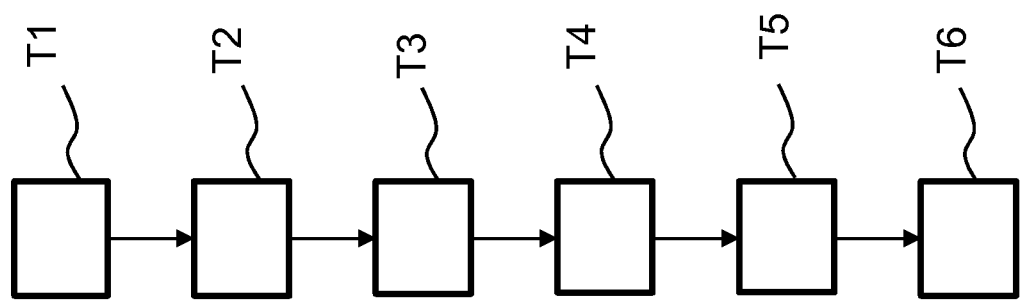

METHOD FOR OPERATING A MONITORING ENTITY

CROSS-REFERENCE TO PRIOR APPLICATIONS

This application is a U.S. National Stage Application under 35 U.S.C. § 371 of International Application No. PCT/EP2017/081693 filed on Dec. 6, 2017, and claims benefit to European Patent Application No. EP 17152709.6 filed on Jan. 23, 2017. The International Application was published in English on Jul. 26, 2018, as WO 2018/133986 A1 under PCT Article 21(2).

FIELD

The present invention relates to a method for operating a monitoring entity, 'ME', for a distributed system, said distributed system comprising a plurality of computing devices, said computing devices performing actions.

The present invention further relates to a monitoring entity, 'ME', for a distributed system, said distributed system comprising a plurality of computing devices, said computing devices performing actions.

The present invention further relates to a distributed system comprising a plurality of computing devices.

The present invention even further relates to a non-transitory computer readable medium storing a program causing a computer to execute a method for operating a monitoring entity, 'ME'.

BACKGROUND

Distributed systems, e.g., software-defined networks with switches, firewalls, network controllers or cloud-bases IT systems comprising storage devices like databases, computation devices, front-ends, etc. are more and more widespread and complex, and they can malfunction for many reasons, including malicious components, software bugs, and hardware or network failures. Conventionally monitoring components of the distributed system verify at runtime whether their performed actions comply with given policies is a possibility for debugging and auditing distributed systems, making such a distributed system more robust and secure. Such conventional policies specify, e.g., what actions must and must not be performed by a component of said distributed system, depending on its previously performed actions, and possibly also actions performed by other components. Such conventional policies may express timing constraints on the actions, e.g., the action B must be performed at most 5 milliseconds after the action A. There are known policy specification languages for expressing such kind of policies, which are based on formal languages, e.g., temporal logics and finite-state machines.

Conventional runtime-verification methods make different assumptions for a distributed system and handle different specifications, differing in their expressivity. For example, it is assumed that the communication within the distributed system is reliable, e.g. no message is lost and a uniform/negligible delay for messages. Furthermore, based on these assumptions, different soundness and completeness guarantees (false positives and false negatives) of the verdicts describing e.g. when and which action caused a policy violation that the monitoring component outputs are provided.

A further conventional runtime-verification method is disclosed in the non-patent literature of D. Basin, F. Klaedtke, and E. Zalinescu, "Failure-aware Runtime Verification of Distributed Systems", in the Proceedings of the 35th IARCS Annual Conference on Foundations of Software Technology and Theoretical Computer Science (FSTTCS), 2015.

SUMMARY

In an embodiment, the present invention provides a method for operating a monitoring entity (ME) for a distributed system, which includes a plurality of computing devices which perform actions. The method includes receiving, by the ME, an action message from a computing device, the message comprising information about one or more actions performed by the computing device. The ME, generates, deletes and/or updates one or more nodes of a data structure stored in a memory of the ME to provide an updated state of the data structure, by: processing the information of the received message, and storing the processed information into the data structure, wherein the data structure represents knowledge about behavior of the distributed system. Each node specifies a policy by a formula, a node is linked by a trigger to one other node only to specify dependencies between nodes except for nodes with a formula, monitored by the ME, and nodes with a same formula are mutually linked by triggers. Verdict information indicating one or more actions violating one or more policies is computed based on the updated state of the data structure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 8 shows steps of a method according to an embodiment of the present invention.

DETAILED DESCRIPTION

Figure 1:
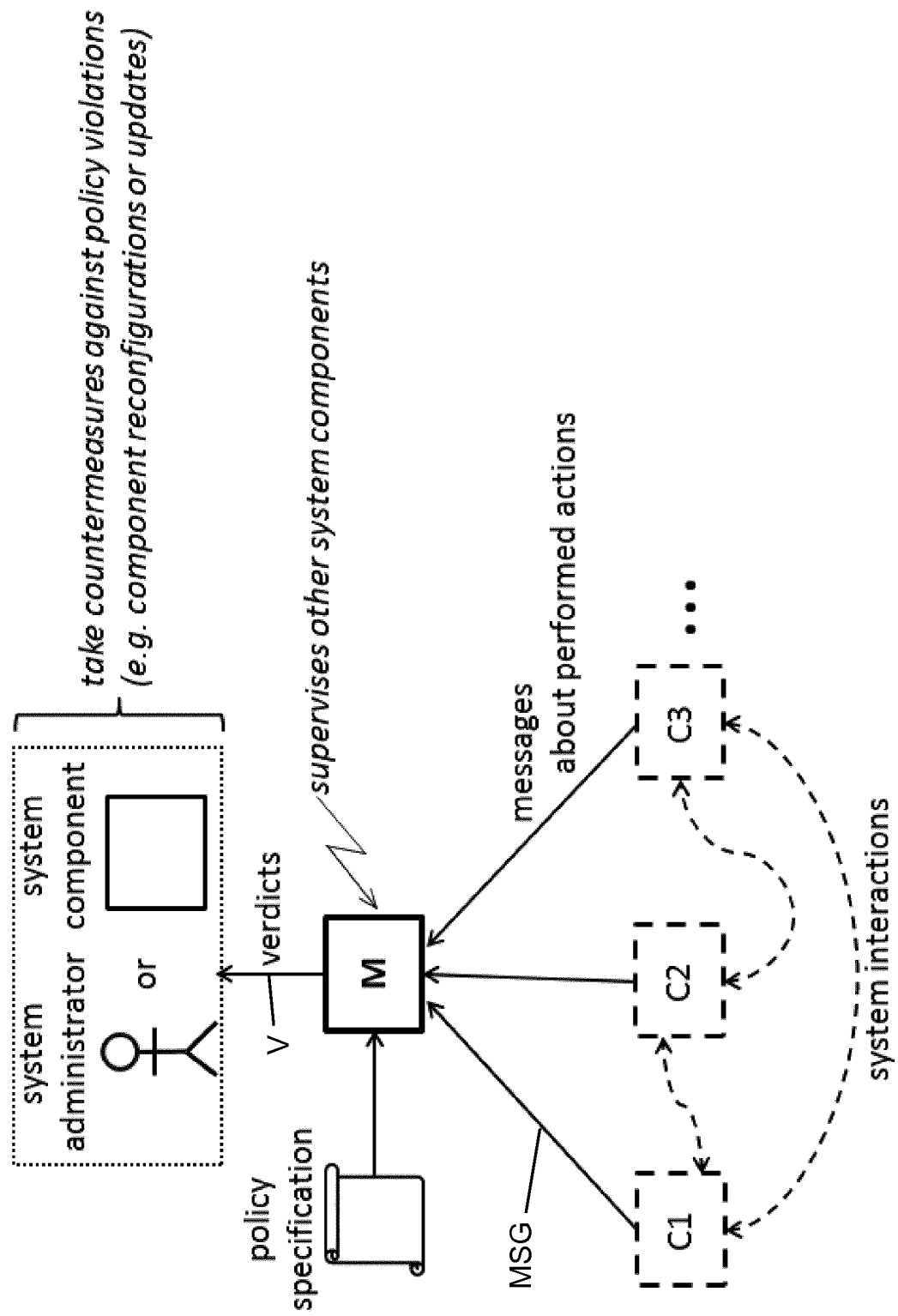
FIG. 1 shows a system according to an embodiment of the present invention.

Conventional runtime-verification methods in general often provide weaker correctness guarantees, make strong assumptions leading to a reduced flexibility in terms of application or are inefficient and lack scalability.

Embodiments of the present invention address the problem of increasing scalability, efficiency and speed in particular for computing verdicts while enhancing the flexibility in terms of applications by weaker assumptions for the distributed system.

In an embodiment the present invention provides a method for operating a monitoring entity, 'ME', for a distributed system, said distributed system comprising a plurality of computing devices, said computing devices performing actions, comprising the steps of Receiving, by said ME, an action message from a computing device, said message comprising information about one or more actions performed by said computing device, Generating, deleting and/or updating, by said ME, one or more nodes of a data structure stored in a memory of said ME, by processing the information of said received message and storing the processed information into said data structure, wherein said data structure represents knowledge about the behavior of said distributed system, and wherein each node specifies a policy by a formula, a node is linked by a trigger to one other node only to specify dependencies between nodes except for nodes with a formula, monitored by said ME, and wherein nodes with the same formula are mutually linked by triggers, Computing verdict information indicating one or more actions violating one or more policies based on the updated state of said data structure.

In other words an embodiment of the present invention provides a method for operating a monitoring entity, 'ME', for a distributed system. Said distributed system comprises a plurality of computing devices. Said computing devices perform actions and interact with each other. When said ME receives an action message from a computing device—an action message being a message, data packet or the like comprising information about one or more actions performed by the sending computing device—said ME then processes the information of said received message and stores the processed information into a data structure in a memory of said ME. The data structure represents the "knowledge" of the behavior of said distributed system. The data structure is organized in one or more nodes, wherein each node specifies a policy. This policy is represented by a formula. A node is linked within the data structure by a trigger to one other node only. These triggers between nodes specify dependencies between nodes. Nodes with a formula being monitored may have more than one trigger. Nodes having the same formula may be stored in a doubly-linked list. The ME then checks if an action violates one or more policies—monitored policies—and computes verdict information indicating one or more actions violating one or more policies when checking of the updated data structure has indicated such a violation.

In a further embodiment of the present invention provides a monitoring entity, 'ME', for a distributed system, said distributed system comprising a plurality of computing devices, said computing devices performing actions, said ME being adapted to perform the steps of Receiving an action message from a computing device, said message comprising information about one or more actions performed by said computing device, Generating, deleting and/or updating one or more nodes of a data structure stored in a memory of said ME, by processing the information of said received message and storing the processed information into said data structure, wherein said data structure represents knowledge about the behavior of said distributed system, and wherein each node specifies a policy by a formula, a node is linked by a trigger to one other node only to specify dependencies between nodes except for nodes with a formula, monitored by said ME, and wherein nodes with the same formula are mutually linked by triggers, Computing verdict information indicating one or more actions violating one or more policies based on the updated state of said data structure.

In a further embodiment the present invention provides a distributed system comprising a plurality of computing devices, said computing devices performing actions, a monitoring entity, 'ME' adapted to perform the steps of Receiving an action message from a computing device, said message comprising information about one or more actions performed by said computing device, Generating, deleting and/or updating one or more nodes of a data structure stored in a memory of said ME, by processing the information of said received message and storing the processed information into said data structure, wherein said data structure represents knowledge about the behavior of said distributed system, and wherein each node specifies a policy by a formula, a node is linked by a trigger to one other node only to specify dependencies between nodes except for nodes with a formula, monitored by said ME, and wherein nodes with the same formula are mutually linked by triggers, Computing verdict information indicating one or more actions violating one or more policies based on the updated state of said data structure.

and an operator adapted to provide policies, to receive verdict information of said ME and/or to initiate actions against policy violation based on said verdict information.

In other words an embodiment of the present invention provides a distributed system. Said distributed system comprises a plurality of computing devices. Said computing devices perform actions and interact with each other. Further the distributed system comprises a monitoring entity according to an embodiment of the present invention. Further the distributed system comprises an operator. The operator provides the policies for system behaviour. The operator further receives the verdict information computed by the monitoring entity and may then initiate actions against the determined policy violation. The operator may determine itself suitable actions or countermeasures against the policy violation. The operator may also receive from said monitoring entity proposals computed by said monitoring entity or by a recommendation entity for countermeasures or the like.

In a further embodiment the present invention provides a non-transitory computer readable medium storing a program causing a computer to execute a method for operating a monitoring entity, 'ME', for a distributed system, said distributed system comprising a plurality of computing devices, said computing devices performing actions, comprising the steps of Receiving, by said ME, an action message from a computing device, said message comprising information about one or more actions performed by said computing device, Generating, deleting and/or updating, by said ME, one or more nodes of a data structure stored in a memory of said ME, by processing the information of said received message and storing the processed information into said data structure, wherein said data structure represents knowledge about the behavior of said distributed system, and wherein each node specifies a policy by a formula, a node is linked by a trigger to one other node only to specify dependencies between nodes except for nodes with a formula, monitored by said ME, and wherein nodes with the same formula are mutually linked by triggers, Computing verdict information indicating one or more actions violating one or more policies based on the updated state of said data structure.

At least one embodiment of the present invention may have at least one of the following advantages:

enhanced efficiency, enhanced scalability, fewer limitations in terms of applications, high correctness guarantees with fewer system assumptions, high flexibility in terms of policies.

The terms "computing device", "computing entity", "component", "system component", "unit", "monitoring entity", "recommendation entity", "storage entity", etc. refer in particular in the claims, preferably in the description each to a device adapted to perform computing and may include but is not limited to a personal computer, a tablet, a mobile phone, a server, or the like and may comprise one or more processors having one or more cores and may be connectable to a memory for storing an application which is adapted to perform corresponding steps of one or more of the embodiments of the present invention. Any application may be software based and/or hardware based installed in the memory on which the processor(s) can work on. The computing devices or computing entities may be adapted in such a way that the corresponding steps to be computed are performed in an optimized way. For instance different steps may be performed in parallel with a single processor on different of its cores. Said devices or entities may each have one or more interfaces to communicate with the environment, e.g. other devices, humans, etc. Examples for an interface include but are not limited to a keyboard, a mouse, a touchscreen, a USB-Port of Type A, B or C, an Ethernet Port, a PS/2-Port, a SIM-Card-Port, a Bluetooth-Port or the like. An example for a monitoring entity includes but is not limited to a Security Information and Event Management SIEM entity or a part thereof correlating events from different system components.

The term "distributed system" is to be understood in its broadest sense and refers in particular in the claims, preferably in the specification to a network of interacting computing devices exchanging information, data or the like which perform actions solely and/or together. Examples for a distributed system include but are not limited to a software-defined network with switches, firewalls, network controllers or a cloud-based IT system comprising storage devices like databases, computation devices, front-ends, etc.

The term "network" is to be understood in its broadest sense and refers in particular in the claims, preferably in the specification to at least two computing entities being connected with each other for communication.

The term "message" is to be understood in the most general sense and refers in particular in the claims, preferably in the specification to a data packet or a certain amount of data, which can be sent, exchanged or received, preferably by a computing device.

The term "data" is to be understood in its broadest sense and refers in particular in the claims preferably in the specification to any kind of information or piece of information in a computing device-readable form or format to be transmitted, used, applied and/or received, etc. within a network.

The term "database" is to be understood in the broadest sense and refers in particular the claims, preferably in the specification to a storage entity for storing data in an organized way. For instance a database may be provided in a memory of the storage entity and may be represented as a list of identifier/word tuples where every (file) identifier $id_i$, $\in I$ taken form the index set I is associated with j words $\{w_j\}_{j \leq n}$, taken from a word dictionary W.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The term "runtime" refers in particular in the claims, preferably in the specification to a computing entity or computing device on which one or more processes, procedures, methods or the like are at the moment run, being executed, performed, processed, operated or serviced.

The term "signature" is to be understood in its broadest sense and means for example any kind of information, which can be identified or used for identification, like strings, patterns or bit-sequences.

The term "state" refers in particular in the claims, preferably in the specification to a situation, status, condition, etc. of an entity, device, data base or data structure being represented by certain values at a specific point in time.

The term "time-stamp" in to be understood in its broadest sense and refers preferably in the claims, in particular in the specification to timing information specifying one or more time points, or one or more time intervals, complete and/or incomplete. Time-stamps may be provided by logical time, wall-clock time or a combination of logical time and wall-clock time, for example from hybrid clocks or the like.

The term "assigning" with regard to computing entities and computing devices refers in particular in the claims, preferably in the specification to the virtual process of linking the entities together for performing a set of functions which is divided or separated to be performed on the linked entities.

The term "MTL" refers to a real-time logic disclosed in the non-patent literature of R. Alur and T. A. Henzinger, "Logics and models of real time: A survey", in Proceedings of the 1991 REX Workshop on Real Time: Theory in Practice, volume 600 of Lect. Notes Comput., Sci., pages 74-100, Springer, 1992.

The term "action" is to be understood in its broadest sense and refers in particular in the claims, preferably in the specification to any kind of act, activity, operation, performance or the like, for instance concrete steps for (re)assignment of computational resources to other virtual functions like allocating memory, freeing allocated memory, increasing or decreasing priority values for a virtual function on a processor, closing of ports of interfaces of a computing entity or the like.

The term "verdict information" refers in particular in the claims, preferably in the specification to any kind of information or data which can be used to identify or provide a verdict of a policy and/or to initiate countermeasures against a policy violation. For example verdict information is provided in form of a message comprising information when and which action caused a policy violation.

The term "violation" with regard to the term "policy" is to be understood in the broadest sense and refers in particular in the claims, preferably in the specification to any mismatch, non-fulfillment, gap or discrepancy of values with one or more thresholds for parameters defining a policy.

The term "tree structure" or a "tree" refers in particular in the claims, preferably in the specification to an abstract data type or data structure implementing the abstract data type simulating a hierarchical tree structure, with a root value and subtrees of children with a parent node, represented as a set of linked nodes. A tree data structure can be defined recursively (locally) as a collection of nodes—starting at a root node—, where each node is a data structure comprising a value, together with a list of references to nodes—the "child nodes"—, with the constraints that no reference is duplicated, and none points to the root. Some of the nodes in the tree structure may refer to physical or virtual entities or users or the like.

The term "policy" is to be understood in its broadest sense and refers in particular in the claims, preferably in the specification to any kind of data, information, etc. defining certain situations, scenarios, or the like which have to be fulfilled or which must not have to be fulfilled, applied, etc. A policy may be implemented, e.g. using logical comparisons, threshold comparisons with pre-defined parameters, or the like. Examples for a policy for SDN networks include but are not limited to "a request of installing a flow rule by the SDN controller must carried out by the switches within 100 ms", or "whenever the master controller is down, the slave controller must take over within 100 ms". An example for a policy for cars includes but is not limited to—engine must not start unless the ignition key is inserted and turned to on". An example for a policy for cloud-based systems includes but is not limited to "computations must not run longer than 1 minute".

The term "node" is to be understood in its broadest sense and refers in particular in the claims, preferably in the specification to an entry, element, etc. in a data structure representing a policy, rule, etc. by a formula, etc.

The term "trigger" is to be understood in its broadest sense and refers or includes but is not limited in particular in the claims, preferably in the specification to a virtual communication channel, reference, pointer, link or the like in a data structure associating at least two elements or entries in the data structure, e.g. nodes.

The term "formula" is to be understood in its broadest sense and refers in particular in the claims, preferably in the specification to one or more logical expressions of propositions.

The term "sub formula" is to be understood in its broadest sense and refers in particular in the claims, preferably in the specification to propositions of a formula.

The term "evaluation" with regard to the term "node" is to be understood in its broadest sense and refers in particular in the claims, preferably in the specification to a picture, state, result, etc. of the formula associated with the node.

The term "temporal connective" is to be understood in its broadest sense and refers in particular in the claims, preferably in the specification to information, data, expression, semantic or the like making a logical expression time-dependent.

The term "metric constraint" with regard to "formula" is to be understood in its broadest sense and refers in particular in the claims, preferably in the specification to any kind of boundary, border, framework or condition limiting a temporal connective, e.g. in time by specifying a time interval. In other words e.g. the metric constraint specifies nodes being "reachable" by a current node.

The term "graph" is to be understood in its broadest sense and refers in particular in the claims, preferably in the specification to a structure amounting to a set of objects in which some pairs of the objects are in some sense related to or linked with each other.

The term "distance" is to be understood in its broadest sense and refers in particular in the claims, preferably in the specification to a parameter indicating some kind of or sort of virtual space, range, separation, gap, interval, displacement, etc. between two nodes in the data structure being defined for example by underlying structure of the data structure. In particular the term "distance" refers to a temporal distance, e.g. a difference between two time intervals.

Further features, advantages and further embodiments are described or may become apparent in the following:

A time-stamp for a performed action may encoded by said computing device in said action message, and wherein nodes with the same formula may be ordered in said data structure according to the time-stamps by said ME. This may provide the advantage of enhancing the efficiency. For example, lookups whether a node exists, can be done by starting from any node: If an associated time interval of the current node is bigger than a time interval of the node to be looked up, the node's predecessor defined by the corresponding trigger is set as starting node and then the search along the data structure, i.e. the triggers, is continued from there. Analogously, if the time interval is smaller, the node's successor is set as starting node and then the search is continued from there. The ordering and the pointers to a node's successor and predecessor can be used for an efficient navigation through the nodes of the data structure. Updating the data structure can also be done efficiently. For example, for deleting a node, only respective pointers of the node and its neighbors need to be adjusted. Such updates may be performed when propagating truth values and when a new message is received by the ME.

Said ME may evaluate in part a node's formula by computing its triggers. This may enable an easy and efficient evaluation of the nodes for the ME when checking for policy violations. For instance outgoing triggers enables showing where a truth values needs to be propagated to. Implicit outgoing triggers can be determined from the explicit outgoing triggers since the nodes to which the outgoing trigger points to is available by the triggers mutually linking nodes. Further updating explicit triggers can be done efficiently when deleting or removing a node.

Said ME may compute and store a trigger between a node having a formula with temporal connective between a first subformula and a second subformula, 'temporal node', and a node having said second subformula, 'second trigger', and/or a trigger between said temporal node and a node having said first formula, 'first trigger' depending at least on the temporal connective. This may provide the advantage of further enhancing the efficiency.

Said ME may compute said triggers depending at least on the temporal connective such that a distance defined at least by said temporal connective is smaller for the first trigger than for the said second trigger. This may enable an efficient updating of the data structure by said ME.

Said ME may store temporarily for a temporal node nodes having said second subformula with true Boolean truth value and a time-stamp. This provides soundness with respect to the logic semantic since the propagation of this value to the temporal node would not be sound. Otherwise, the ME may output false positives and/or false negatives. Furthermore, it is more efficient of having these pending anchors instead of keeping mutually linked nodes. The invariants of the data structure can also be easier maintained.

Said ME may store temporarily for a temporal node the closest node being a node having said second subformula and having provided said Boolean truth value. This enables them to ignore other nodes that are "further away". Thus, the efficiency may be further enhanced.

Said ME may update truth values of formulas of nodes along the triggers in the data structure. This enables an efficient updating.

Said ME may check upon receiving said message whether said time-stamp in said received message lies within an incomplete time interval of a node and if yes, said ME may compute and store new nodes for said time-stamp and splits said time-interval at said time-stamp and may generate and store new nodes for said split parts. This enables adding of time points in an efficient way.

Said action message may comprise a sequence number and said ME determines based on sequence numbers if said data structure comprises nodes with time-stamps of a complete interval, said nodes are deleted. This saves computational resources for storing the data structure.

Boolean values of deleted nodes may be stored with other nodes. This ensures soundness of the semantic of the logic.

Said data structure stored in said memory may be computed by said ME to form a graph like a directed acyclic graph. This may provide an efficient structure for organizing the data for the data structure.

In FIG. 1 a system architecture according to an embodiment of the present invention is shown with a monitoring component M which supervises system components C1, C2, C3 etc.

The system components C1, C2, C3, . . . are instrumented such that they inform the monitoring component M about their performed actions. The monitoring component M checks at runtime the compliance of the component's behaviour, i.e., the actions performed by the components C1, C2, C3, . . . , with respect to a given policy.

Alternatively, the actions can be logged and the monitoring component M can inspect these logs later. In case of a violation of a policy the monitoring component M outputs a verdict V. The verdicts V may inform the system administrator or a dedicated system component about the violations. Depending on the kind of violation, the system administrator or the component may take appropriate countermeasures, for example, by reconfiguring or updating the system component C1, C2, C3, . . . , or it may even terminate some of the system components C1, C2, C3.

The messages MSG sent to the monitoring component M comprise an unambiguous description of the performed action and a timestamp, the latter e.g. in form of a logical time, wall-clock time, or a combination of both, i.e. timestamps from hybrid clocks, describing when the action was performed and how it relates time-wise to other actions. Furthermore, the messages MSG could be encrypted and could include signatures and hashes to prevent tampering. A verdict V describes e.g., when and which action caused the policy violation.

In the following, it is assumed that policies are given as formulas of the real-time logic MTL. The grammar of MTL is given by:

spec ::= TRUE
 | p
 | (NOT spec)
 | (spec OR spec)
 | (spec SINCEI spec)
 | (spec UNTILI spec)

Here, p ranges over the set of propositions, which describe actions or properties of actions. Furthermore, I specifies a relative time period. For example, the formula (p UNTIL(0,3s] q) is true at time t if the proposition p is true at any time from t onwards until the proposition q is true. In addition, the time s where q is true must satisfy the metric constraint, provided by the interval (0,3 s], relative to the time t, i.e., q must be true within 0 and 3 seconds, where 0 is excluded and 3 included.

Variants and extensions to the real-time logic MTL and also other policy specification languages could be used. For instance, a freeze quantifier, as disclosed in the non-patent literature of D. Basin, F. Klaedtke, and E. Zalinescu, "Runtime Verification of Temporal Properties over Out-of-order Data streams", In the Proceedings of the 29th International Conference on Computer Aided Verification (CAV), which is herein incorporated by reference, to reason about data values can be used as extension of the above core policy specification language.

Figure 2:
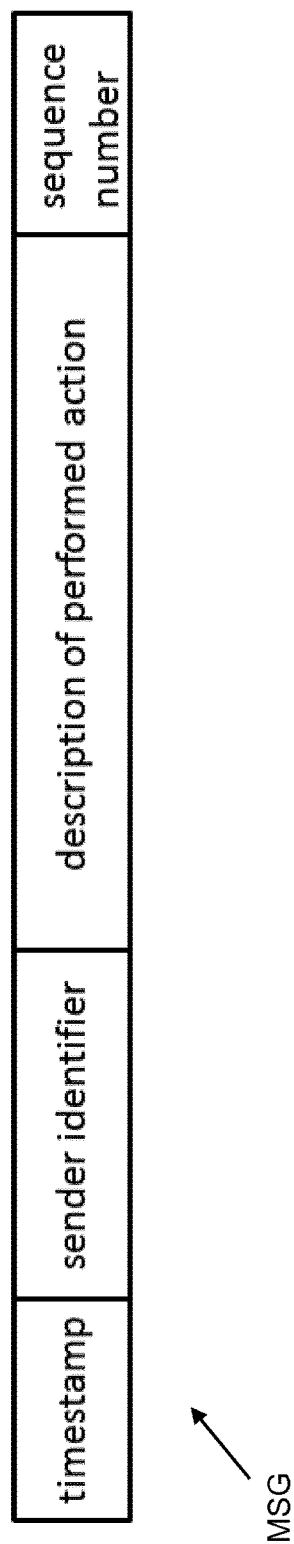
FIG. 2 shows part of the method according to an embodiment of the present invention.

FIG. 2 shows part of the method according to an embodiment of the present invention.

In FIG. 2 a format of the message MSG sent by the system components to the monitoring component M is shown.

In detail the monitoring component M receives messages MSG from the system components C1, C2, C3, . . . . Such a message MSG describes the action performed by the component C1, C2, C3, . . . . Examples of actions are the sending or receiving of a message to and from another system component C1, C2, C3, . . . , or an update of the component's state such as increasing a counter, opening a file, etc. In addition, a message MSG may include an identifier of the system component C1, C2, C3, . . . and when the action was performed, i.e., a timestamp. Furthermore, a message MSG may comprise a sequence number, i.e., the number of performed actions of the system component C1, C2, C3, . . . up to the specified time. Additional information like signatures and/or hashes could also be included in a message MSG. Their validity can then be checked by the monitoring component M.

Figure 3:
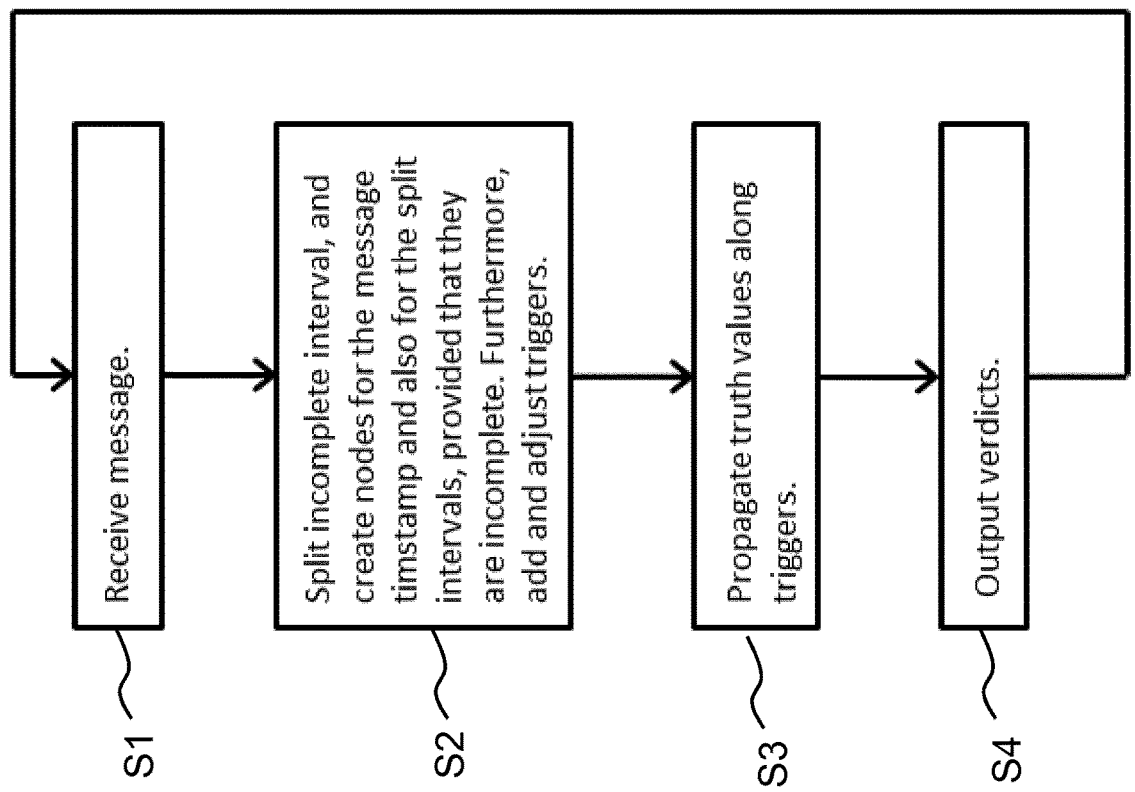
FIG. 3 shows steps of a method according to an embodiment of the present invention.

FIG. 3 shows steps of a method according to an embodiment of the present invention.

In FIG. 3 a loop of steps of the monitoring component is shown which are continuously executed.

In a first step S1 the monitoring component M receives a message from a system component C1 informing about a performed action and its timing information.

In a second step S2 the monitoring component M splits an incomplete interval if present and creates nodes for the message timestamp and also for the split intervals, provided that they are incomplete. Even further triggers are adjusted and added.

In the third step S3 truth values are propagated along the triggers in the data structure and in the fourth step S4 one or more verdicts are outputted.

In the following the steps S2 and S3 are described in detail:

The step S2 comprises several substeps S2a-S2e.

Figure 4:
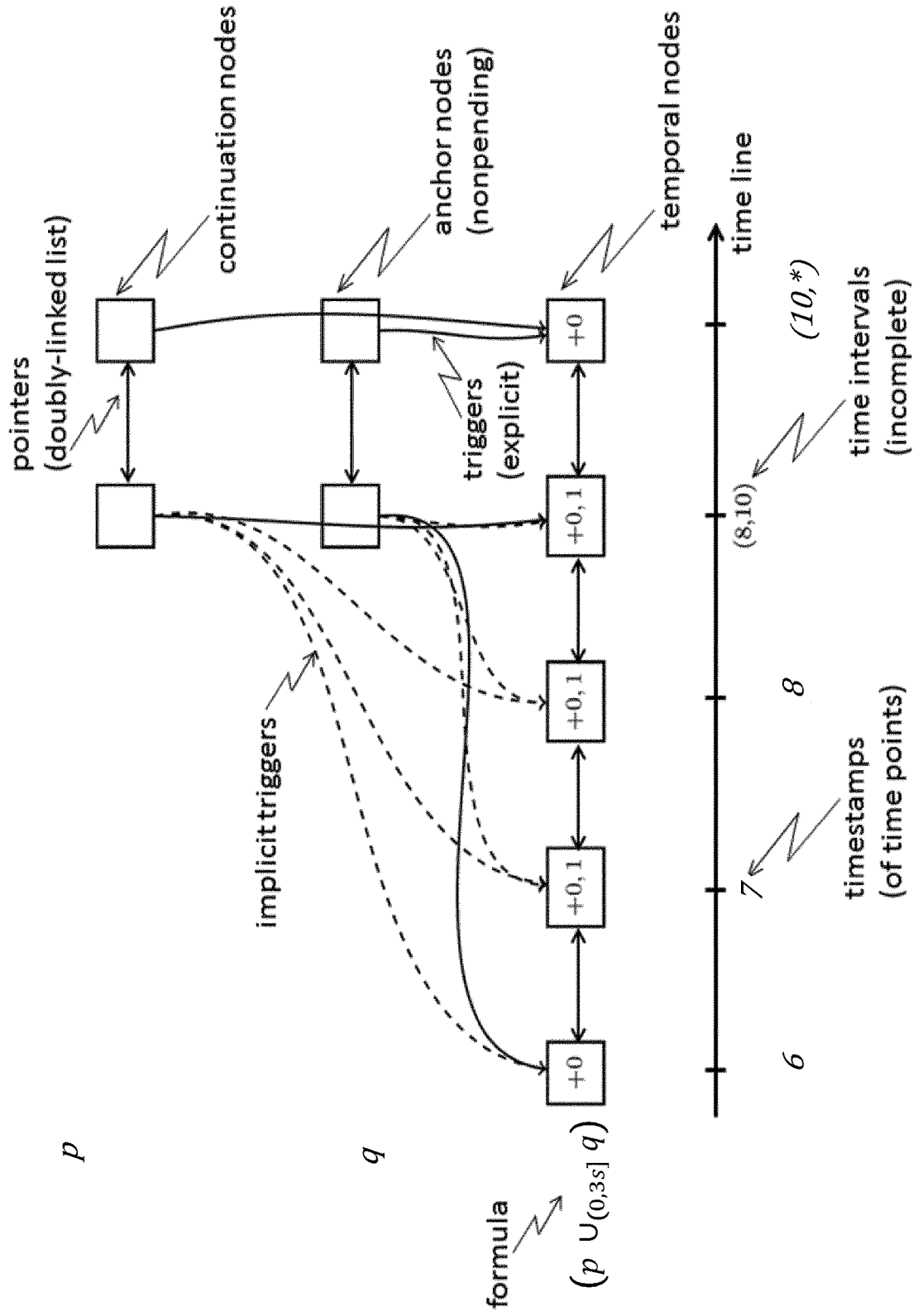
FIG. 4 shows a data structure according to an embodiment of the present invention.

In substep S2a the monitoring component M determines the incomplete interval comprising the timestamp of the received message MSG for splitting the incomplete interval. Here, the monitoring component M can, e.g. maintain an ordered list or a search tree of incomplete intervals, and lookup the interval comprising the timestamp of the message MSG received. With reference to the following FIG. 4, incomplete intervals of the data structure according to FIG. 4 are the intervals (8,10) and (10,*). In the update of the data structure from FIG. 4 to FIG. 5, it is assumed that the received message MSG has the timestamp 9. Hence, the determined incomplete interval in this substep is (8,10).

In a next substep S2b the monitoring component M splits the incomplete interval determined in substep S2a. The split depends on the message's timestamp. Furthermore, the monitoring component M determines the intervals that are complete, i.e., the incomplete intervals that are guaranteed to not comprise a timestamp of any message received and processed by the monitoring component M in a later loop of FIG. 3.

In the non-patent literature of D. Basin, F. Klaedtke, E. Zalinescu, "Failure-aware Runtime Verification of Distributed Systems" (FSTTCS 2015), which is herein incorporated by reference, is described, e.g., how the complete intervals can be determined through sequence numbers of messages. Not only intervals resulting from the split can be complete. With reference to FIG. 4 the intervals (8,9) and (9,10) resulting from splitting the interval (8,10) at 9 are assumed to be complete in the running example, i.e., the monitoring component M will not receive messages MSG with a timestamp in (8,10) in later loop iterations. Furthermore, the monitoring component M does not know in this example whether it will receive further messages MSG with a timestamp in the incomplete interval (10,*). Hence, the incomplete interval (10,*) remains incomplete.

In a next substep S2c the monitoring component M removes the nodes of the complete intervals from the data structure. With reference to FIG. 4 no nodes are removed in this running example, since the incomplete interval (10,*) remains incomplete.

In a next substep S2d the monitoring component M splits the nodes of the interval determined in substep S2a. With reference to FIG. 4 the split of the interval (8,10) at time 9 only results in the singleton {9} and the newly created nodes are all for the timestamp 9, since the intervals (8,9) and (9,10) are complete. If the intervals (8,9) and (9,10) would not be complete, the split of the interval (8,10) would result in the intervals (8,9), {9}, and (9,10). Furthermore, the resulting updated data structure would comprise nodes for all these three intervals.

In a next substep S2e the monitoring component M adjusts the explicit triggers of the nodes in the data structure and maintains the invariants of the data structure. This adjustment includes in particular outgoing triggers of newly created nodes for the intervals from substep S2d and triggers from existing nodes to the newly created nodes. The adjusted explicit triggers are inherited from the triggers of the nodes of the split interval. A node with no explicit or implicit ingoing triggers is assigned to its corresponding Boolean truth values. Furthermore, newly created nodes also inherit pending nodes, which may propagate their Boolean truth value true in the step S3 to the newly created node. With reference to FIG. 4, the explicit trigger from the anchor node q for the split interval (8,10) to the temporal node at timestamp 6 results in an explicit trigger from the newly created anchor node q for the timestamp 9 to the temporal node at timestamp 6. Furthermore, the newly created continuation node q for the timestamp 9 inherits the explicit trigger from the continuation node q for the split interval (8,10).

Step S3 may be performed recursively together with steps S1 and S2 or operations of step S3 may be performed repeatedly:

If a root node evaluates to a Boolean truth value and the root node corresponds to a timestamp, the monitoring component M generates the corresponding verdict information, which is output in step S4. Otherwise, Boolean truth values for root nodes for an incomplete interval are stored by the monitoring component M and these truth values possibly result in verdicts or at least verdict information that are output in later iterations of steps S1-S4.

If a non-root node evaluates to a Boolean truth value, the truth value is propagated along the non-root nodes' explicit and implicit triggers to its parent nodes. For maintaining the invariants of the data structure, some of the explicit triggers may be adjusted. Furthermore in some cases the propagation of a Boolean truth value along a trigger may be postponed. In particular, postponing the propagation of the Boolean truth value true from an anchor node to a temporal node results in pending anchors as described further below.

A node that has propagated its Boolean truth value to all its parent nodes is removed from the data structure. This removal is also recursive, i.e., a child node with only explicit and implicit triggers to removed nodes is also removed.

In the following FIG. 4-7 the steps of FIG. 3 are explained with reference to an example data structure.

FIG. 4 shows a data structure according to an embodiment of the present invention.

In FIG. 4 an example of a graph structure for computation of a verdict is shown.

For computing verdicts V, the monitoring component M maintains a graph structure as data structure, which is updated whenever receiving a message MSG from a system component C1, C2, C3. Non-graph-based representations, i.e. data structures are also possible. FIG. 4 shows components of said graph structure. Each node comprises or is associated with a formula, and a timestamp or an incomplete interval. In FIG. 4, these components are shown on the x-axis and y-axis, respectively.

Nodes have triggers, pointing to other nodes. They specify dependencies between nodes and represent the partial evaluation of a node's truth value. Nodes with the same formula can be identified by an implicit doubly-linked list that is ordered increasingly by the timestamps and incomplete intervals. Said doubly linked list is implicitly included in the data structure by nodes with the same formula having triggers to each other. Incomplete intervals are non-overlapping and timestamps of time points are not included in any incomplete interval. Implicit triggers indicated by dashed lines in FIG. 4 are not part of the maintained data structure.

Analogously, the timeline in the lower part of FIG. 4 is not part of the data structure, which is given through the timestamps and incomplete intervals of the nodes.

In FIG. 4 different kinds of nodes are shown, depending on the nodes' formula and their subformulas and superformulas:

A node is called a "leaf" if its formula is TRUE or a proposition p.

A node is called a "root" if its formula is the monitored formula.

A node is called a "Boolean node" if its formula's main connective is NOT or.

A node is called a "temporal node" if its formula's main connective is a temporal connective (SINCE or UNTIL).

A node is called an "anchor node" if its formula is the second subformula of the formula of a temporal node.

A node is called a "continuation node" if its formula is the first subformula of the formula of a temporal node.

If a root evaluates to a Boolean truth value and the root corresponds to a timestamp, the monitoring component generates—as already mentioned above—corresponding verdict information. Otherwise, Boolean truth values for roots for an incomplete interval are stored by the monitoring component and these truth values may result in verdict information that are output later.

If a non-root node evaluates to a Boolean truth value, the truth value is propagated—as already mentioned above—along the nodes' explicit and implicit triggers to its parent nodes. The propagation of a Boolean truth value along a trigger may be postponed, and may result in so-called pending anchors as described below.

Each node, except the roots, has a single outgoing trigger. A Boolean node e.g. with the formula (p OR q) has at most two incoming triggers, namely one trigger from a node with the formula p and one trigger from a node with the formula q. The timestamps or intervals of these nodes are the same. If the node with the formula p or q has already a Boolean truth value, then the node does not exist anymore and its truth value has been propagated to the node with the formula (p OR q).

The triggers of a temporal node are distinguished between triggers from anchor nodes and trigger from continuation nodes: The data structure comprises a trigger from an anchor node to the temporal node that is "furthest away" in distance, the distance being dependent on the temporal connective, its metric constraint, and the timestamps or incomplete intervals of the nodes. For example, in FIG. 4, the anchor node with the formula q and incomplete interval (8,10) has a trigger to the temporal node with the timestamp 6. The other triggers of this anchor node to the temporal nodes with the timestamps 7 and 8, and the incomplete interval (8,10) are implicit. The data structure further comprises a trigger from a continuation node to the temporal node that is "closest" in terms of the above-mentioned distance.

Furthermore, a temporal node might store or in other words may be associated with the above-mentioned pending anchors. A pending anchor is an anchor node with a timestamp and the Boolean truth value "true". The propagation of this truth value to the temporal node is however not sound with respect to the logic's semantic. In particular, the metric constraint is satisfiable but not valid. Such a situation may arise in FIG. 4 when looking at the node with timestamp 6, the metric constraint +3 seconds with regard to the interval (8,10): The metric constraint is partially valid for the interval (8,9] but not valid for the interval (9,10). These pending anchors are not represented in the doubly-linked list of the anchor node's formula.

A temporal node also stores the closest anchor node that has propagated the Boolean truth value "true" to the node. Anchor nodes that are "further away" in terms of distance than this valid anchor node can be ignored for the temporal node. The shown numbers of the temporal nodes in FIG. 4 indicate the number of the pending anchors (+x) and whether the temporal node has a valid anchor or not. In the graph structure shown in FIG. 4, there are no non-pending anchors (+0), and the temporal nodes at the timestamps 7 and 8, and also the incomplete interval (8,10) have all the same valid anchor at time 10.

All together the triggers of a temporal node, i.e. explicit, implicit and pending triggers describe the partial evaluation of a temporal node. This partial evaluation can be represented as a Boolean combination of the source nodes, i.e. anchor nodes and continuation nodes. The data structure of this Boolean combination is also not stored in the data structure and left implicit. When a node has propagated its Boolean truth value to all its parent nodes said node is removed from the data structure. This removal is also recursive, i.e., a child node with only explicit and implicit triggers to removed nodes is also removed.

Figure 5:
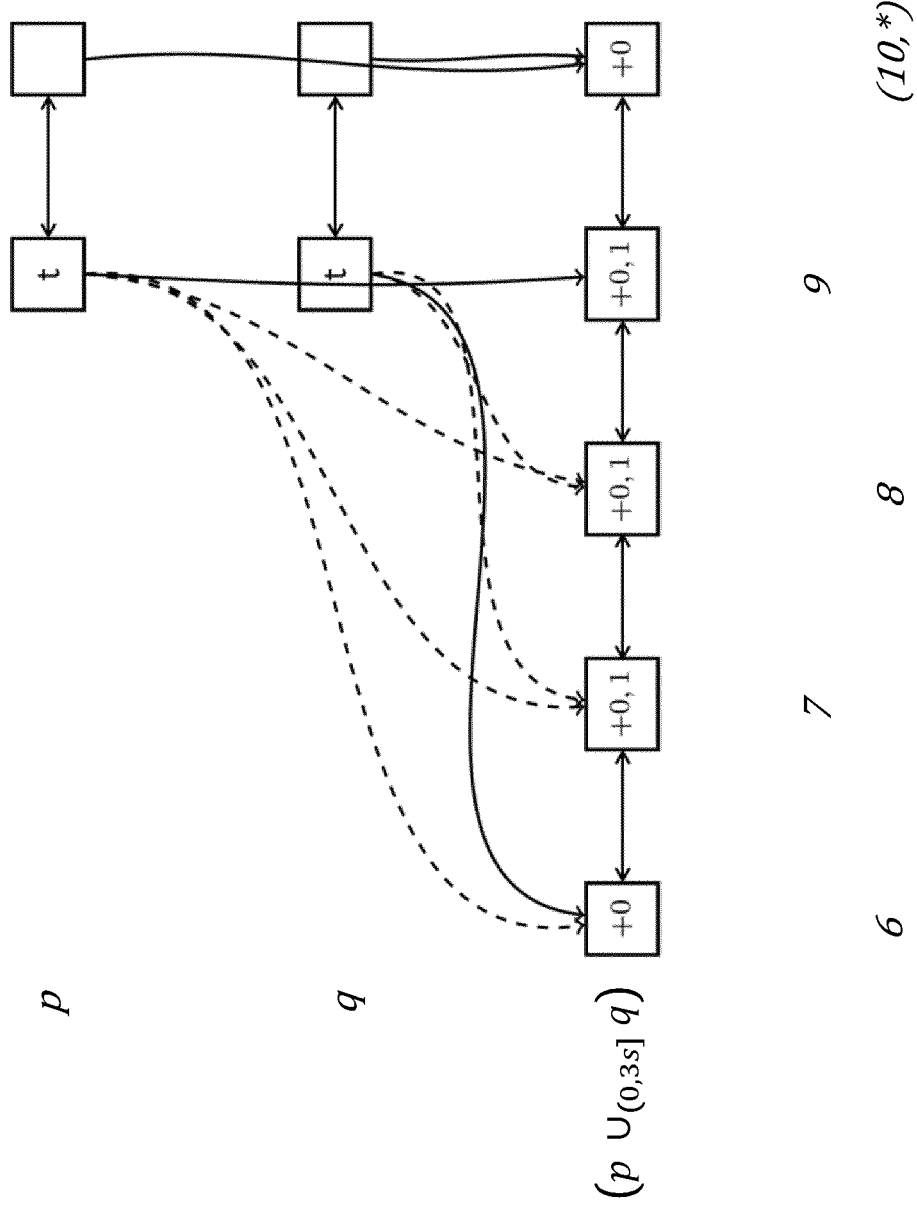
FIG. 5 shows an updated data structure of FIG. 4.

FIG. 5 shows an updated data structure of FIG. 4.

In FIG. 5 and updated graph structure for a new time point with timestamp 9 is shown.

In detail in case the monitoring component M receives a message MSG with the timestamp t then the nodes with the incomplete interval I comprising t are split. In particular, new nodes with the timestamp t are computed. If the two halves of I, split at t, are incomplete, new nodes for these incomplete intervals are also computed. Whether these intervals are incomplete can, e.g. be determined by the sequence numbers of the messages as e.g. disclosed in the non-patent literature of D. Basin, F. Klaedtke, and E. Zalinescu, "Failure-aware Runtime Verification of Distributed Systems", in the Proceedings of the 35th IARCS Annual Conference on Foundations of Software Technology and Theoretical Computer Science (FSTTCS), 2015. From the ingoing and outgoing explicit triggers of the split nodes, the explicit triggers for the newly created or computed nodes are created such that the invariants are maintained, which means in particular that computed new nodes have to be correctly placed with regard to time within the organisation of the data structure and explicit triggers have to be updated if needed.

Furthermore, when receiving a message MSG it may be inferred that an interval K already contained in the data structure is complete, no further messages MSG with timestamps in this interval will be received by the monitoring component M. In this case the nodes with the interval K are deleted. However, according to the logic's semantics, it might be necessary to propagate Boolean truth values from these nodes. For example, when deleting an anchor node with the interval K, the Boolean truth value "false" is propagated to temporal nodes with intervals different from K.

FIG. 5 now shows the updated graph structure, originating from the graph structure shown in FIG. 4, where the monitoring component M received a message MSG with the timestamp 9. In this example the two intervals when splitting the incomplete interval (8,10) at 9 are complete and the proposition p and q are true at time 9. Hence, the two corresponding leaves are marked with the Boolean truth value true.

Figure 6:
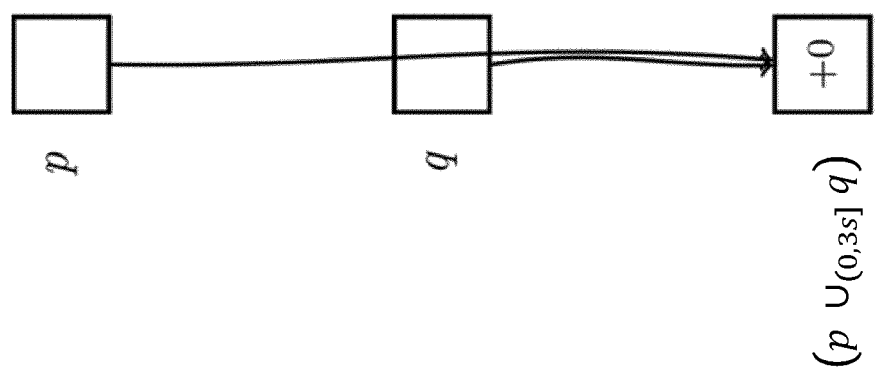
FIG. 6 shows and updated data structure of FIG. 5.

FIG. 6 shows an updated data structure of FIG. 5.

In FIG. 6 an updated graph structure after the propagation of truth value is shown.

In detail in case a received message MSG describes that a proposition p at a time t has the Boolean truth value b, then the monitoring component M updates the graph structure by initiating a propagation from the node with the proposition p and the timestamp t. If this node does not exist, the data structure is not updated.

The truth value is propagated along the explicit and implicit triggers from a node including also a Boolean node with a formula with main connective NOT, also complementing the truth value. Furthermore, a propagation to a temporal node may be postponed, based on the semantics of the logic. For instance, it can be the case that an anchor node becomes a pending anchor node of a temporal node. Such a postponed propagation may continue later when splitting incomplete intervals and creating the respective nodes.

The propagation updates the explicit triggers and maintains the invariants of the data structure. In case a Boolean truth value is propagated to a root node with a timestamp, the monitoring component M outputs a corresponding verdict V for the truth value. If a Boolean truth value is propagated to a root node with an incomplete interval, the monitoring component M does not directly output a verdict V. Instead, it outputs a corresponding verdict V whenever it receives a message MSG with a timestamp in this interval.

FIG. 6 shows now part of the graph structure, resulting from the graph structure in FIG. 5, when propagating the Boolean truth value true from the two leaves with the timestamp 9 and the propositions p and q, respectively. The monitoring component M also outputs the verdicts V true for the timestamps 6, 7, 8, and 9.

Figure 7:
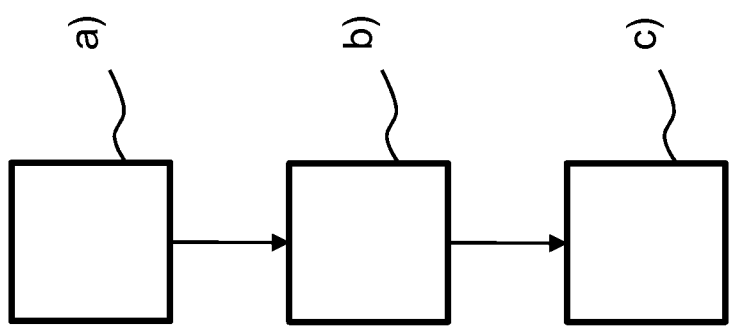
FIG. 7 shows the steps of a method according to an embodiment of the present invention.

FIG. 7 shows steps of a method according to an embodiment of the present invention.

In FIG. 7 a method for operating a monitoring entity, 'ME', for a distributed system is shown, said distributed system comprising a plurality of computing devices, said computing devices performing actions, comprising the steps of
a) Receiving, by said ME, an action message from a computing device, said message comprising information about one or more actions performed by said computing device,
b) Generating, deleting and/or updating, by said ME, one or more nodes of a data structure stored in a memory of said ME, by
    processing the information of said received message and storing the processed information into said data structure, wherein said data structure represents knowledge about the behavior of said distributed system, and wherein each node specifies a policy by a formula,
    a node is linked by a trigger to one other node only to specify dependencies between nodes except for nodes with a formula, monitored by said ME, and wherein nodes with the same formula are mutually linked by triggers,
c) Computing verdict information indicating one or more actions violating one or more policies based on the updated state of said data structure.

FIG. 8 shows steps of a method according to an embodiment of the present invention.

In FIG. 8 steps for policy checking are shown. It is assumed that the system administrator specifies the system/security policies, deploys the monitoring component in an IT system and the system components C1, C2, . . . so that they send messages MSG to the monitoring component M describing their performed actions.

In a first step T1 the monitoring component M runs in parallel to the other system components C1, C2, C3, . . . and checks policy compliance at runtime. Whenever a system component C1, C2, . . . performs an action, the system component informs the monitoring component M in a second step T2 via message passing about the performed action.

Whenever the monitoring component receives a message in a third step T3 from a system component C1, C2, C3, . . . , it updates its state in a forth step T4 and computes in a fifth step T5 the verdicts, i.e. the monitoring component's data structure comprising of nodes with triggers and doubly-linked lists is updated by adding new time points and propagating Boolean truth values. Furthermore the monitoring component M outputs the computed verdicts, i.e. policy violations in a sixth step T6.

In summary at least one embodiment of the present invention may enable or provide an optimized graph structure for the verdict computation of a monitoring component M. In particular, nodes of the same formula may be represented implicitly in a doubly-linked list and each node may point explicitly to only one node. The other outgoing pointers of a node are implicit.

Efficient update operations, i.e. adding a new time point to the data structure and propagating Boolean truth values up of the graph structure that maintain the necessary invariants are enabled. In particular, for the propagation of Boolean truth values, a node does not store its partial valuation explicitly. Instead, a node's partial evaluation can be computed by its explicit and implicit pointers.

At least one embodiment of the present invention may have, provide or enable at least one of the following:
    enhanced efficiency for checking compliance of distributed systems at runtime,
    enhanced scalability,
    enhanced flexibility in terms of policy specification language and applications,
    strong correctness guarantees, and/or
    fewer assumptions/boundary conditions enhancing the flexibility.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a monitoring entity (ME) for a distributed system comprising a plurality of computing devices which perform actions, the method comprising:
receiving, by the ME, an action message from a computing device, the message comprising information about one or more actions performed by the computing device,
generating, deleting and/or updating, by the ME, one or more nodes of a data structure stored in a memory of the ME to provide an updated state of the data structure, by:
processing the information of the received message, and
storing the processed information into the data structure, wherein the data structure represents knowledge about the behavior of the distributed system, and wherein:
each node specifies a policy by a formula,
a node is linked by a trigger to one other node only to specify dependencies between nodes except for nodes with a formula, monitored by the ME, and
nodes with a same formula are mutually linked by triggers, and
computing verdict information indicating one or more actions violating one or more policies based on the updated state of the data structure.

2. The method according to claim 1, wherein a time-stamp for a performed action is encoded by the computing device in the action message, and wherein the nodes with the same formula are ordered in the data structure according to the time-stamps by the ME.

3. The method according to claim 1, wherein the ME evaluates in part the formula of one of the nodes by computing its triggers.

4. The method according to claim 3, wherein the ME computes and stores a second trigger between a temporal node having a formula with temporal connective between a first subformula and a second subformula, and one of the nodes having the second subformula, and/or a first trigger between the temporal node wand one of the nodes having the first formula, depending at least on the temporal connective.

5. The method according to claim 4, wherein the ME computes the triggers depending at least on the temporal connective such that a distance defined at least by the temporal connective is smaller for the first trigger than for the second trigger.

6. The method according to claim 4, wherein the ME stores temporarily, for the temporal node, nodes having the second subformula with Boolean truth value and a time-stamp.

7. The method according to claim 6, wherein the ME stores temporarily, for the temporal node, a closest one of the nodes having the second subformula and having provided the Boolean truth value.

8. The method according to claim 1, wherein the ME updates truth values of the formulas of the nodes along the triggers in the data structure.

9. The method according to claim 1, wherein the ME checks upon receiving the message whether a time-stamp in the received message lies within an incomplete time interval of a node and if yes, the ME generates and stores new nodes for the time-stamp and splits the time-interval at the time-stamp and computes and stores new nodes for the split parts.

10. The method according to claim 1, wherein the action message comprises a sequence number and the ME determines based on sequence numbers whether the data structure comprises nodes with time-stamps of a complete interval and then deletes the nodes.

11. The method according to claim 10, wherein Boolean values of the deleted nodes are stored with other ones of the nodes.

12. The method according to claim 1, wherein the data structure stored in the memory is computed by the ME to form a graph, like a directed acyclic graph.

13. A monitoring entity (ME) for a distributed system, the distributed system comprising a plurality of computing devices which are configured to perform actions, the ME comprising one or more hardware processors that, alone or in combination, are configured to perform a method comprising:
receiving an action message from a computing device, the message comprising information about one or more actions performed by the computing device,
generating, deleting and/or updating one or more nodes of a data structure stored in a memory of the ME to provide an updated state of the data structure, by:
processing the information of the received message, and
storing the processed information into the data structure, wherein the data structure represents knowledge about behavior of the distributed system, and wherein:
each node specifies a policy by a formula,
a node is linked by a trigger to one other node only to specify dependencies between nodes except for nodes with a formula, monitored by the ME, and
nodes with a same formula are mutually linked by triggers, and
computing verdict information indicating one or more actions violating one or more policies based on the updated state of the data structure.

14. A distributed system comprising a plurality of computing devices which are configured to perform actions, a monitoring entity (ME), and an operator, the ME comprising one or more hardware processors that, alone or in combination, are configured to perform a method comprising:
receiving an action message from a computing device, the message comprising information about one or more actions performed by the computing device,
generating, deleting and/or updating one or more nodes of a data structure stored in a memory of the ME to provide an updated state of the data structure, by:
processing the information of the received message, and storing the processed information into the data structure, wherein the data structure represents knowledge about the behavior of the distributed system, and wherein:
> each node specifies a policy by a formula,
> a node is linked by a trigger to one other node only to specify dependencies between nodes except for nodes with a formula, monitored by the ME, and wherein
> nodes with a same formula are mutually linked by triggers, and computing verdict information indicating one or more actions violating one or more policies based on the updated state of the data structure;

the operator being configured to provide policies, to receive verdict information of the ME and/or to initiate actions against policy violation based on the verdict information.

15. A non-transitory computer readable medium storing a program causing a computer to execute a method for operating a monitoring entity (ME) for a distributed system, the distributed system comprising a plurality of computing devices which perform actions, the method comprising:

receiving, by the ME, an action message from a computing device, the message comprising information about one or more actions performed by the computing device, generating, deleting and/or updating, by the ME, one or more nodes of a data structure stored in a memory of the ME to provide an updated state of the data structure, by:
> processing the information of the received message, and
> storing the processed information into the data structure, wherein the data structure represents knowledge about the behavior of the distributed system, and wherein:
>> each node specifies a policy by a formula,
>> a node is linked by a trigger to one other node only to specify dependencies between nodes except for nodes with a formula, monitored by the ME, and nodes with a same formula are mutually linked by triggers, and computing verdict information indicating one or more actions violating one or more policies based on the updated state of the data structure.

* * * * *